Feb. 27, 1934.   J. M. CHRISTMAN   1,948,698
TOOL HOLDER
Filed Oct. 8, 1928   2 Sheets-Sheet 1

Inventor
JOHN M. CHRISTMAN.
By *Miller Tibbets*
Attorney

Feb. 27, 1934.   J. M. CHRISTMAN   1,948,698
TOOL HOLDER
Filed Oct. 8, 1928   2 Sheets-Sheet 2
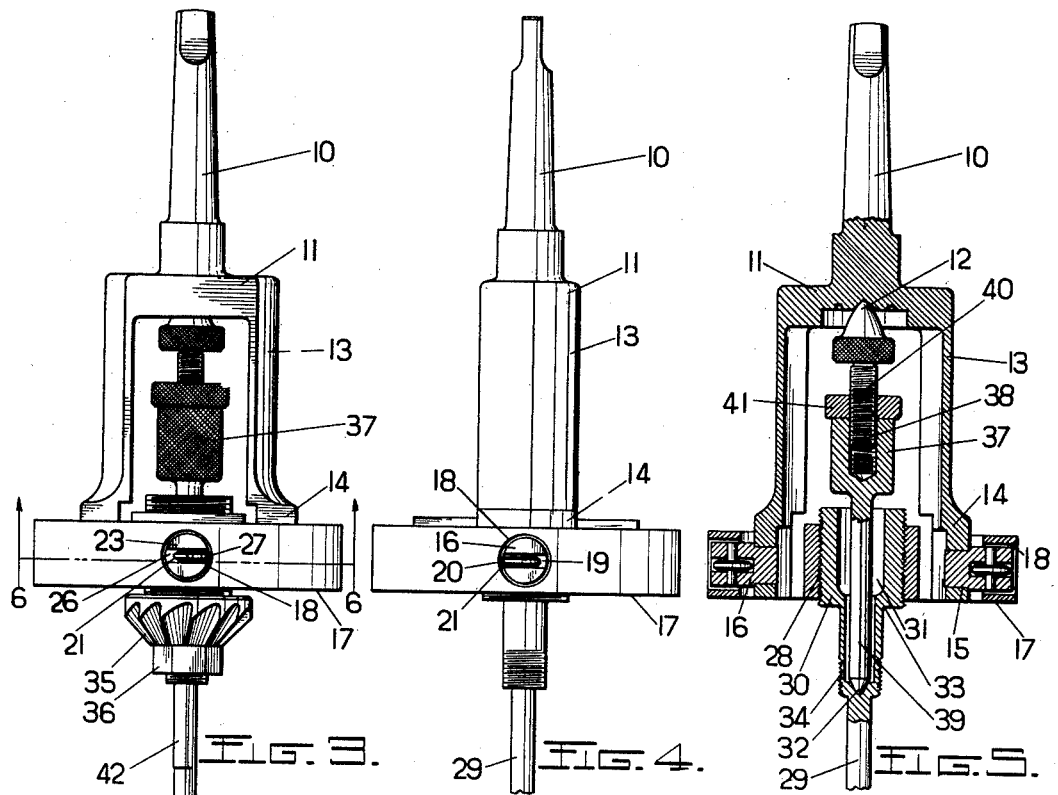
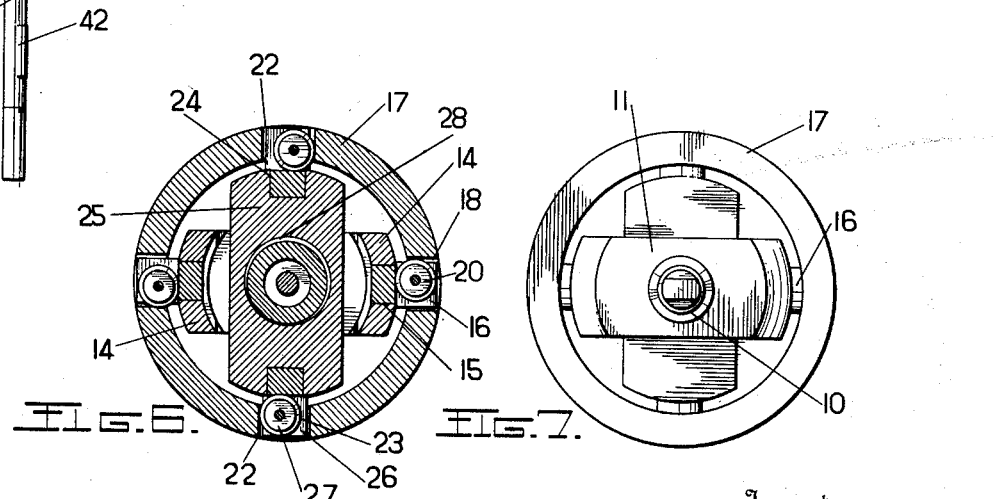
Inventor
JOHN M. CHRISTMAN.
By
Attorney Patented Feb. 27, 1934

1,948,698

UNITED STATES PATENT OFFICE 1,948,698

TOOL HOLDER

John M. Christman, Detroit, Mich., assignor to Packard Motor Car Company, Detroit, Mich., a corporation of Michigan Application October 8, 1928. Serial No. 311,013

9 Claims. (Cl. 279—16)

This invention relates to tool holders and more particularly to holders for reamers.

Generally, in the manufacture of internal combustion engines the cylinders of the engine together with the respective ports are cast in block. Guide holes are then drilled normal to the face of the block and guides are pressed in the holes and bored for the reception of valve stems. Because of slight inaccuracies in drills and in the adjustment thereof the guide holes and the guides are seldom bored absolutely true, that is, normal to the top face of the cylinder block and accordingly when reaming the valve seats concentric and normal to the bores in the valve stem guides the valve seats are not as a general rule in parallel relation to the face of the block, but vary to a greater or less degree according to the inaccuracies resulting from the drilling process.

These inaccuracies are generally recognized by manufacturers and this together with other causes resulted in reaming valve seats by hand. While the result attained with hand reamers has to a certain extent proved satisfactory such practice naturally tends to increase the cost of production. Aside from the increased cost of such manual operation, quantity production has been found to increase cost owing to the number of mechanics required and the efficiency of their work.

It is well established that no two mechanics will perform the work with the same precision, hence valve seats reamed by hand vary to a greater or less extent and therefore the uniformity desired is more or less destroyed. In order to correct these evils it is proposed to provide a machine operated valve seat reamer for reaming or cutting valve seats concentric and normal to the bores in the valve stem guide with a uniformity and precision not found possible to attain by use of hand reamers.

An object of the invention is to provide a flexible head for reamers.

Another object of the invention is to provide means for cutting the valve seat concentric and normal to the axis of a valve stem.

Another object of the invention is to provide means for cutting valve seats which may be easily and quickly adjusted to the work and will efficiently perform its intended function.

Yet another object of the invention is to provide means for cutting and finishing valve seats which can be quickly centered in the valve stem guide and so operated that it will efficiently perform its intended function.

A further object of the invention is to provide means for cutting valve seats provided with a flexible head and a self-adjusting pilot.

A further object of the invention is to provide means for cutting valve seats having a flexible head susceptible of adjustment in a plurality of directions so that the cutting instrumentality might be accurately centered to cut valve seats concentric to a bore in the valve stem guide.

Yet a further object of the invention is to provide a pilot adapted to fit snugly in bores of various sizes and to support a cutting instrumentality in such a position that it will function to cut or ream valve stem seats concentric and normal to the bore in which the pilot is positioned.

Still a further object of the invention is to provide means for cutting valve seats which shall be highly efficient in operation and yet of marked simplicity as a whole and in respect to each of its component parts so that its manufacture may be economically facilitated both as regards parts and their assembly.

Other objects of the invention will appear from the following description taken in connection with the drawings which form a part of this specification, and in which:

Fig. 3 is an elevation;

Fig. 4 is a view similar to Fig. 3, the head being turned through an angle of ninety degrees;

Fig. 5 is a vertical sectional view;

Fig. 6 is a cross sectional view on line 6—6 of Fig. 3, and

Fig. 7 is a top plan view.

Figure 1:
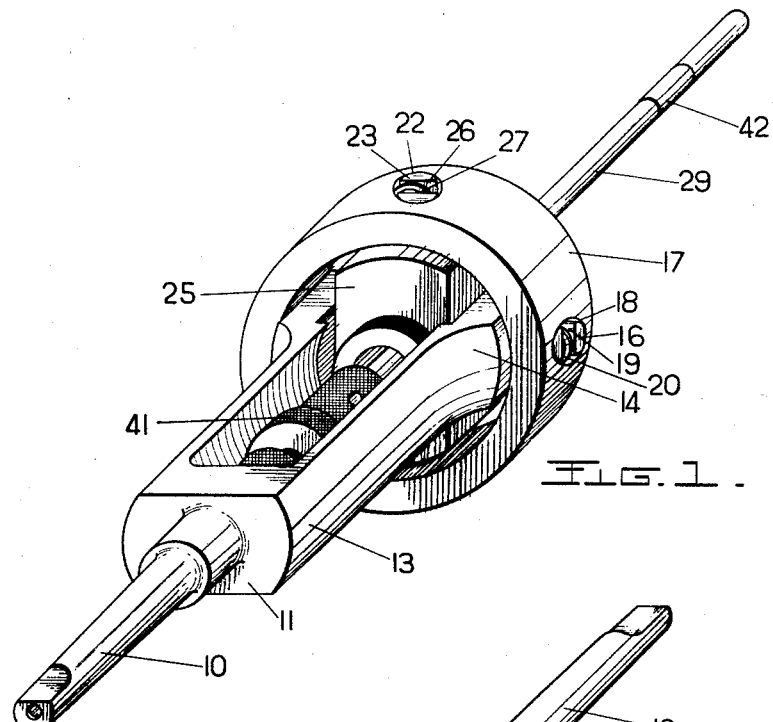
Fig. 1 is a perspective view of the tool supporting head and pilot.
Figure 2:
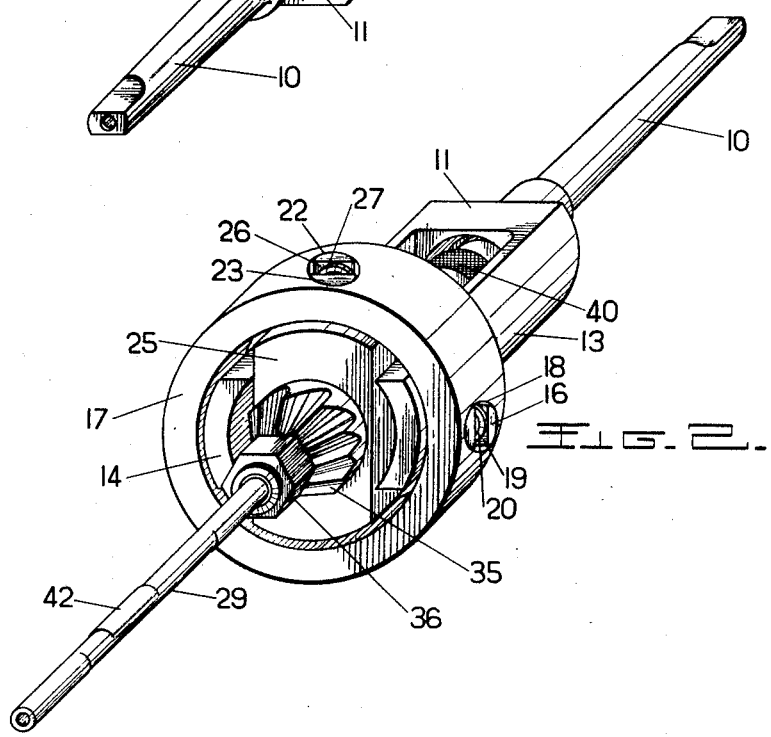
Fig. 2 is a similar view in reverse position, illustrating a rose cutter positioned on the shank of the pilot.

Referring to the drawings for more specific details of the invention, 10 represents the shank of the tool which may be of any preferred structure suitable for mounting in the head of a machine adaptable for imparting rotary motion to the tool. Formed integral with the shank is a yoke which, as shown, comprises a cross head 11 having a center 12 and parallel arms 13. The free ends of the arms 13 are offset and enlarged as indicated at 14. These enlarged portions are substantially arcuate and are provided with transverse bores 15 alined with respect to each other.

Positioned in the transverse bores 15 are trunnions 16 upon which is mounted a ring 17 which receives the load from the yoke. The ring is provided with radial bores 18 which receive the trunnions 16 and is adapted for oscillation and reciprocation on the trunnions within certain limits and that the reciprocatory movement may be free and easy or sensitive, even though the ring is under load, the trunnions are provided with diametral slots 19 normal to the axis of the shank 10, and journaled in the slots are rollers 20 adapted to engage the walls of the bores 18, the peripheries of the rollers being beveled as indicated at 21 so that friction will be substantially reduced.

The ring 17 is provided with radial bores 22 which receive trunnions 23 mounted in bores 24 in the respective ends of a block 25. The trunnions 23 have diametral slots 26 in which are journaled rollers 27 similar in structure to the rollers 20. These rollers are adapted to receive the load from the ring 17. The block 25 is adaptable for oscillatory and reciprocatory movements within the ring 17, hence the connection between the shank and the block is in the nature of a combined Oldham coupling and universal joint and might well be termed a floating connection.

Positioned centrally in the block 25 is a bore 28 in which is threaded a pilot 29. As shown, the pilot 29 has an enlarged portion 30 threaded into the bore 28 and provided with a central bore 31 in the bottom of which is a center 32 and formed on the enlarged portion 30 of the pilot is a shoulder 33 threaded as indicated at 34. A rose cutter 35 has a press fit on the shoulder 33 and is secured in position by a nut 36 which is screwed on the threads 34.

The pilot 29 is centered by an expansible member or centering pin having an enlarged portion 37 axially bored and threaded as indicated at 38 and an elongated pin 39 adapted to engage the center in the bottom of the axial bore in the pilot and threaded in the bore 38 is a pin 40 adapted to engage the center 12 in the cross head 11. The pins 39 and 40 may be contracted or expanded by threading the pin 40 into or out of the bore 38 and may be locked in adjusted position by the lock nut 41 threaded on the pin 40. In operation, the expansible member or centering pin takes the downward thrust.

The bores in the valve stem guides are generally in two sizes, small bores for the valve stems of the intake valves and larger bores for the valve stems of the exhaust valves. To provide a pilot which may be self-adjusting to both sizes of bores the pilot 29 is provided with a plurality of bosses 42 formed thereon in staggered relation with respect to each other. As shown these bosses comprise arcuate sections which are arranged in staggered relation with respect to each other on the periphery of the pilot so that when the pilot engages one of the larger bores it will fit snugly therein and maintain the cutter in proper relation to the work under treatment and when the pilot is engaged with one of the smaller bores the raised portions on the pilot cause the pilot to spring or yield at various portions throughout its length and to fit properly within the bore, to maintain the cutter in proper relation to the work.

It is to be observed, that upon adjusting the shank 10 in the head of a machine adaptable for imparting rotary movement thereto the yoke carried by the shank is supported in a rigid position, that the ring 17 positioned on the trunnions mounted on the yoke is free to oscillate and to reciprocate within certain limits and that the ring receives the load from the yoke through the rollers positioned in the trunnions carried by the yoke.

It is also to be observed that the load on the ring is received by the trunnions in the respective ends of a block 25 in which is adjustably mounted the pilot. The block is susceptible of oscillation and reciprocation within the ring, thus the pilot has a very sensitive connection with the shank. This connection is a combined Oldham coupling and universal joint which provides a very suitable means for supporting the pilot to provide ready adjustment thereof in a bore and to avoid the danger of disalinement when in operation. The centering device employed is an expansible member which may be adjusted between the shank and the pilot to retain these parts in position relative to each other and to take the downward thrust. It will further be observed that the pilot is self-adjusting to bores of different diameter and hence the cutter may be operated efficiently at any position whether in alinement with or off-center from the axis of the shank.

Although this invention has been described in connection with certain specific embodiments, the principles involved are susceptible of numerous other applications which will readily occur to persons skilled in the art. The invention is therefore to be limited only as indicated by the scope of the appended claims.

Having thus described the various features of my invention, what I claim as new and desire to secure by Letters Patent is:

1. A tool holder comprising a shank, a ring supported by the shank for oscillation and reciprocation with respect thereto, a member supported by the ring for oscillation and reciprocation relative thereto, a tool supporting means on the member, and thrust means between the shank and the tool supporting means.

2. A tool holder comprising a shank, a ring mounted diametrically on the shank adaptable for oscillatory and reciprocatory movements with respect to the shaft, a member mounted diametrically in the ring adaptable for oscillatory and reciprocatory movements relative thereto, means on the member for supporting a tool, and thrust means between the shank and the member.

3. A tool holder comprising a shank, a yoke on the shank, a ring supported on and adaptable for oscillation and reciprocation with respect to the yoke, a member supported in the ring adaptable for oscillation and reciprocation with respect thereto, a tool supporting means on the member and an expansible centering pin between the tool supporting means and the shank.

4. A tool holder comprising a shank having a yoke formed integral therewith, a ring supported on the yoke for oscillation and reciprocation with respect to the shank axis, a member supported in the ring adaptable for oscillation and reciprocation therein, a tool supporting means threaded into the member, and an expansible centering pin between the supporting means and the shank.

5. A tool holder comprising a shank, a yoke on the shank, trunnions on the yoke, a ring on the trunnions adaptable for oscillation and reciprocation thereon, a member having trunnions mounted in the ring, the member being adapted for oscillation and reciprocation with respect to said ring, a tool supporting means threaded in the member, and an expansible centering pin between the supporting means and the shank.

6. A tool holder comprising a shank having a yoke, trunnions on the yoke, rollers positioned in the trunnions, a ring mounted for oscillation on the trunnions and for reciprocation on said rollers, a member having trunnions mounted in the ring whereby the member may be oscillated, rollers in the trunnions on the member whereby said member may be reciprocated, a tool support detachably mounted on the member, and an expansible member between the support and the shank.

7. A tool holder comprising a shank having a yoke, trunnions on the yoke, a ring having diametral bearings on the trunnions, rollers in the trunnions, a member having trunnions thereon mounted diametrically in the ring, a tool support threaded in the member, and an expansible centering pin between the tool support and the shank.

8. A tool holder comprising a shank having an integral yoke at its end, a member mounted on the yoke for combined oscillation and reciprocation thereon, a tool supporting member mounted to oscillate and reciprocate with respect to the first member, and an expansible pin adapted to transmit thrust between the shank and the tool supporting member.

9. A tool holder comprising a shank having an integral yoke at its end, a ring member mounted for limited oscillatory and reciprocatory movement on said yoke, a tool supporting member mounted for limited oscillatory and reciprocatory movement on said ring member, and an expansible pin to maintain said shank and said supporting member approximately in spaced relationship and to transmit thrust therebetween.

JOHN M. CHRISTMAN.